United States Patent Office 3,399,081
Patented Aug. 27, 1968

3,399,081
PROCESS FOR PREPARING PREGELATINIZED STARCHES
Raffaele Bernetti, Rozzano, Italy, and Charles H. Staff, Highland, and Stanley A. Watson, La Grange Park, Ill., assignors to Corn Products Company, New York, N.Y., a corporation of Delaware
No Drawing. Filed Aug. 5, 1964, Ser. No. 387,769
5 Claims. (Cl. 127—71)

This invention describes a novel process for preparation of pregelatinized starch products employing the gelatinizing effects of liquid ammonia in nonaqueous media. By several variations of the basic process, a series of starch products can be prepared that have varied but predictable pasting properties in cold or hot water.

Dry, pregelatinized starch preparations have long had attractive potential in many applications where rapid paste preparation without prolonged cooking is desired. They have generally been prepared by one of two methods: (1) Use of heated metal rolls to dry a previously prepared paste or to simultaneously gelatinize and dry a wet starch filter cake; (2) Spraying a starch paste into heated air. The resulting starch products have several faults that have limited their usefulness.

The main disadvantage of previously known pregelatinized starches is poor dispersibility in water. When the starch particles are contacted with water, the surface layers quickly absorb water and become gelatinous. The gelatinous film restricts water penetration leaving a lump with a dry center. Improvement of water dispersibility has been obtained by partial acid or enzymic degradation, but such products have low thickening power and low fabric sizing value. Introduction of substituent chemical groups that exert a solubilizing action during starch dispersion may improve dispersibility, but starch properties are permanently altered.

Another disadvantage of previously prepared cold water dispersible starches has been loss of viscosity and thickening power as compared with the parent starch. Loss of viscosity is largely due to retrogradation of solubilized amylose that is not rehydratable after drying.

Still another disadvantage of previously prepared pregelatinized starches has been poor susceptibility to enzymic digestion resulting from retrogradation of amylose.

It is an object of this invention to provide a practical means whereby any starch, such as corn starch or purified starch from any other source, may be converted to a dry, free flowing product that is completely gelatinized but retains the granule form. Gelatinization is defined as loss of birefringence of starch granules viewed microscopically under plane polarized light.

Another object of this invention is to produce starch products that are readily dispersible in cold or hot water and which have predictable swelling and dissolving properties.

Still another object is to produce pregelatinized starch products that exhibit cold paste viscosities upon initial dispersion in cold water. These starches will also be shown to retain essentially the same hot paste viscosities (Scott method) as the parent starch.

A further object of this invention is to prepare pregelatinized starch products that are completely susceptible to enzymic hydrolysis upon dispersion in water below the normal starch pasting temperature.

A still further object is to prepare a cold water dispersible starch that has a settling rate in water and fabric sizing properties equivalent to raw rice starch.

Other chemists have utilized the liquid ammonia effect on starch to improve its reactivity toward methylation reagents or fractionation agents, such as butanol. For this purpose, starch was first pasted in liquid ammonia to achieve nearly complete granule disorganization (addition of a little water causes complete granule rupture). The starch was recovered by pouring the ammonia paste into ethanol to dissolve and dilute the ammonia, thereby precipitating the starch substance. A similar technique has been used to dehydrate aqueous starch pastes by pouring into ethanol to recover the starch substance in amorphous form.

We have investigated the entire phenomena of the action of liquid ammonia on starch and have found totally new and unexpected rules of behavior. For example, when regular corn starch is immersed in various mixtures of ammonia and methanol, the starch granules lose birefringence over a definite range of concentrations. At 35% (B.W.) ammonia, granules are unaffected; in a 38% solution a few granules lose birefringence; in a 42% solution about 98% of the granules have no birefringence. Various solvents that are miscible in ammonia have different critical concentration ranges for starch gelatinization. Different starch types are gelatinized at different ranges of ammonia-methanol concentration, just as they have different gelatinization temperature ranges in water.

In the practical application of this discovery, we prefer to use methanol in solution with at least 45% (B.W.) liquid ammonia. The boiling point of the mixture is −14° C. The starch may be added to the mixture as a dry powder or it may be slurried in the methanol and the ammonia added to the slurry. In any event, the mixture is held for a definite period of time because we have observed that increase in the length of the holding time effects a definite, though small, increase in degree of swelling of the final product. At the end of the desired holding time the mixture is heated to evaporate the ammonia. During this process the starch is bathed in methanol of gradually decreasing ammonia concentration which causes the granules gradually to deswell to near their original size. The starch is then readily recovered from the methanol by filtration. The starch filter cake is dried in a circulating air oven heated to 50°–60° C. Methanol and ammonia are completely removed and the product becomes a free-flowing, granular material showing no microscopic birefringence.

When the granules of liquid ammonia-methanol treated starch are mounted dry on a microscope slide and observed under a magnification of 100 to 200× and then contacted with water, they can be seen to immediately swell to a volume 10 to 20 times the original volume. The swelling volume is dependent on the type of starch used and the conditions of the liquid ammonia-methanol treatment. The degree of swelling is least for products treated with the 45% ammonia-methanol mixture and increases with use of increasing ammonia concentrations.

A more precise method of characterizing the product starches is by use of the measurement of swelling power and solubles at various temperatures as described by Leach, McCowan and Schoch (Cereal Chem. 36; 534–544 (1959)).

Total fat content of the product starches is useful in predicting the pasting characteristics. Fat is determined by complete acid hydrolysis of the starch and extraction of the hydrolyzate with hexane. Reduction in fat content causes increase in swelling power and solubles values of treated starches.

Treatment of starch in a solution of 45% ammonia (B.W.) in methanol produces minimum effect. Such starches have swelling powers of 6–12 at 25° C. Increasing the ammonia concentration in methanol gives products with increased swelling power and solubles values up to a maximum at about 85% ammonia in methanol. There is no significant advantage in the use of undiluted liquid ammonia for pasting the starch followed by addition of methanol. In fact, the higher paste viscosity of this system is a distinct disadvantage in that a lower starch concentration must be employed than is possible in the system employing ammonia-methanol mixtures.

We have shown that liquid ammonia-methanol treatment in accordance with our invention can be applied to any purified starch from all sources of starch-bearing vegetable materials such as regular corn, regular sorghum, wheat, sweet potato, tapioca, potato and regular rice as well as waxy corn, waxy sorghum, waxy rice and amylomaize (high amylose corn).

Theatment of high amylose corn starch (amylomaize) with liquid ammonia holds considerable practical interest. This starch, which may contain from 45 to 70% (or even higher) linear fraction and only 55 to 30% (or lower) of the branched fraction—depending on the inherited characteristics of the corn—must be cooked in water at temperatures of 120°–150° C. in order to develop satisfactory paste properties. We have found that a concentration of 50% ammonia in methanol produces initial loss of granular birefringence, and a concentration of 55% ammonia produces complete loss of birefringence for starch containing 55% apparent amylose. High amylose corn starch (55% or 70% linear) treated with 55% ammonia in methanol produces a dry granular starch product that is readily dispersible in water at 25° C. and exhibits a swelling power of 9 and solubles value of 11%. With this starch, fat removal (initially 0.9%) has an even more pronounced effect on paste properties than in the case of regular corn starch. By use of a high concentration of ammonia and an excess of methanol, we have produced a product that has a swelling power at 25° C. of 17, solubles value of 36%, and a fat content of 0.4%.

In certain parts of the world, rice starch is preferred for the sizing of wearing apparel because the small (1–5 micron) granules remain suspended in water for hours while the housewife is conducting her ironing operation. The fabric is immersed in the rice starch suspension (5 grams per liter) and the fabric then wrung out and ironed. The small granules penetrate the fabric and produce a paste when ironed which upon drying gives a stiff size to the fabric. Ordinary corn starch, or any other large granular starch for that matter, settles out of suspension too rapidly and is too little retained by the fabric to produce the desired results. However, we have discovered that corn starch treated with 45% ammonia in methanol, in the manner previously described, will produce an aqueous suspension at a level of 5 grams per liter that duplicates almost exactly the settling properties and the sizing characteristics of raw rice starch. The ammonia-methanol treated corn starch remains suspended for many hours. The swollen granules are sufficiently retained by the fabric, even after drying, so as to produce a stiff size when ironed. As little as 1 gram of this starch per liter of water has produced a good size for an ordinary cotton percale.

Having thus described the various attributes of our invention, we now wish to more fully illustrate the specific details with the following examples.

Example I.—Critical ammonia-solvent ratios for starch gelatinization

This example reveals the minimum critical concentrations of ammonia in various solvents that produce initial and complete gelatinization of corn starch. The different ammonia solutions listed in the table below were prepared as follows:

Two hundred and fifty grams of the solvent was placed in a Dewar flask and liquid ammonia added with agitation until the required concentration was obtained. Five grams of unmodified corn starch was added to each of the ammonia-solvent solutions and the slurries held for 5 minutes. The slurries were then heated to 30° C., filtered and the filter cakes dried at 55° C. Each of the dried filter cakes was examined in water at room temperature with the aid of a polarizing microscope. The percentage of granules which still exhibited birefringence was determined.

TABLE I

| Solvent | Percent Ammonia (Weight Basis) | | | | |
|---|---|---|---|---|---|
| | 25 | 30 | 35 | 40 | 45 |
| | Percent Granules Exhibiting Birefringence | | | | |
| Methanol | 100 | 100 | 100 | 60 | 0 |
| Ethanol | 100 | 100 | 100 | 53 | 0 |
| 1-propanol | 100 | 100 | 100 | 10 | 0 |
| 2-propanol | 100 | 100 | 100 | 7 | 0 |
| Butanol | 100 | 100 | 35 | 0 | |
| Pentasol | 100 | 48 | 0 | | |
| Acetone | 53 | 0 | | | |

This example shows that the minimum concentration of ammonia that will completely gelatinize corn starch is not constant, but is different for each solvent.

We have also found that the minimum concentration of ammonia that will gelatinize starch is not identical for every starch. Waxy sorghum and waxy maize starches were found to be 98% gelatinized in a 43% ammonia-methanol solution. High amylose corn starch is completely gelatinized in a 55% ammonia-methanol solution.

Example II.—Gelatinizing corn starch with a 45% ammonia-methanol solution

A 46% amomnia-methanol solution was prepared by adding liquid ammonia to 2320 grams of methanol until the solution contained 1970 grams of ammonia. One thousand grams of corn starch (12.6% moisture) was added to the ammonia-methanol solution. During addition of the starch, ammonia was evolved to give a final concentration of approximately 45% ammonia based on methanol. The slurry was held for 5 minutes at the prevailing temperature of −14° C., and then was heated on a steam bath to evolve ammonia. The temperature gradually increased and when it reached 30° C., the slurry of deswollen starch was filtered and the filter cake dried at 60° C. The dried product was exposed to the atmosphere to equilibrate the starch to ambient relative humidity.

Characteristics of the corn starch before and after ammonia pregelatinization are shown in Table II below:

TABLE II

| Starch | Moisture | Percent Protein, d.b. | Total fat, d.b. | Swelling power 25° C. | Percent Solubles, d.b., 25° C. | Scott Viscosity (10.8 g.d.s./280-ml. slurry) outflow time, seconds |
|---|---|---|---|---|---|---|
| Untreated | 12.6 | 0.36 | 0.6 | 2 | 0.0 | 74 |
| Ammonia-methanol gelatinized | 8.5 | 0.35 | 0.5 | 11 | 3.7 | 138 |

The data show that ammonia-methanol pregelatinization has caused pronounced changes in the characteristics of the original corn starch.

Example III.—The effect of various ammonia-methanol concentrations upon starch properties This example is presented to show the effect on corn starch of increasing the ammonia concentration in the gelatinizing system. Table III shows the quantity of ingredients used to prepare the different samples of pregelatinized corn starch. In each case, the unmodified corn starch (10.2% moisture) was added to the gelatinizing system and held for 5 minutes; additional methanol was added as needed to facilitate recovery of the starch. The slurry of starch was heated to 30° C., filtered and the filter cake dried at 55° C. The dried products were equilibrated to room moisture in 1 day.

The above data reveals that increasing the holding time of the starch in the gelatinizing system has a slight positive effect of increasing the swelling power and solubles values of the products. The effect of holding time was less at higher ammonia concentrations.

TABLE III

| Sample No. | Composition of Gelatinizing System | | | | | Added methanol required for recovery of starch (grams) |
| --- | --- | --- | --- | --- | --- | --- |
| | Ammonia (grams) | Methanol (grams) | Corn starch (grams) | Percent ammonia based on methanol | Percent starch based on ammonia | |
| 1 | 860 | 1,050 | 700 | 45 | 45 | 580 |
| 2 | 860 | 462 | 429 | 65 | 33.2 | 558 |
| 3 | 860 | 152 | 250 | 85 | 22.5 | 519 |
| 4 | 690 | 0 | 150 | 100 | 17.9 | 427 |

The data in Table III demonstrate that the use of mixtures of ammonia and methanol for gelatinizing starch has a distinct advantage over the use of pure liquid ammonia in process operation by permitting the use of higher concentrations of starch in the gelatinizing system.

Characteristics of the pregelatinized products are shown in Table IV.

TABLE IV

| Sample No. | Gelatinizing agent | Swelling power | | Percent solubles, d.b. | | Scott viscosity, 12 grams/10% moisture |
| --- | --- | --- | --- | --- | --- | --- |
| | | 25° C. | 85° C. | 25° C. | 85° C. | |
| 1 | 45% ammonia-methanol | 11 | 19 | 3.9 | 11.9 | 83 |
| 2 | 65% ammonia-methanol | 12 | 23 | 6.8 | 14.2 | 95 |
| 3 | 85% ammonia-methanol | 14 | 24 | 6.8 | 14.7 | 91 |
| 4 | Liquid ammonia | 14 | 29 | 6.8 | 16.9 | 54 |

This example shows that whereas a starch product made by treatment with pure liquid ammonia exhibits maximum swelling when placed in cold or hot water, the use of mixtures of methanol and ammonia provides a means of producing starch products that have a limited or restricted swelling power in cold or hot water in proportion to the ratio of methanol to ammonia used in their preparation.

The characterization data shown in Table IV reveal that the greatest effect of ammonia pregelatinization occurs in treating corn starch in 45–85% ammonia-methanol solution. Maximum peak Brabender viscosity was achieved by treatment with 45% ammonia.

The starch product made by our procedure is readily and quickly dispersible in warm water (25–65° C.) without lumping. Starch prepared using 100% liquid ammonia is difficult to disperse in warm water due to severe lumping.

Example IV.—Effect of holding time on the gelatinizing medium

Corn starch was held for various lengths of time in ammonia gelatinizing systems to determine how holding time affects the characterization of the final product. Each sample in Table V was prepared as follows:

One-hundred grams of corn starch was suspended in 277 grams of methanol and this slurry was stirred, chilled in Dry Ice-acetone bath, and a measured amount of liquid ammonia was added. The swollen corn starch granules were held for various lengths of time in the gelatinizing system. They were recovered as described in Examples I and II.

TABLE V

| Sample No. | Grams ammonia added | Percent ammonia based on methanol | Holding time, minutes | Product characteristics | |
| --- | --- | --- | --- | --- | --- |
| | | | | Swelling power, 25° C. | Percent solubles, d.b., 25° C. |
| 1 | 249 | 47.3 | 5 | 6.3 | 2.0 |
| 2 | 249 | 47.3 | 20 | 9.7 | 2.6 |
| 3 | 249 | 47.3 | 60 | 10.3 | 3.8 |
| 4 | 249 | 47.3 | 120 | 10.9 | 3.3 |
| 5 | 249 | 47.3 | 240 | 11.3 | 3.4 |
| 6 | 524 | 65.4 | 5 | 11.6 | 3.9 |
| 7 | 524 | 65.4 | 20 | 11.2 | 4.1 |
| 8 | 524 | 65.4 | 60 | 11.8 | 4.6 |

Example V.—Effect of several solvents on the properties of pregelatinized starches One-hundred grams of corn starch was slurried in 277-gram portions of each solvent listed in Table VI. The slurries were cooled in a Dry Ice-acetone bath and 523 grams of liquid ammonia added to each. The starch was held in the gelatinizing system 20 minutes, the recovered as explained in Example II.

TABLE VI

| Sample No. | Recovery solvent (277 grams) | Product characteristics | |
| --- | --- | --- | --- |
| | | Swelling power, 25° C. | Percent solubles, d.b., 25° C. |
| 1 | Methanol | 11.2 | 4.1 |
| 2 | Ethanol | 15.9 | 16.1 |
| 3 | Acetone | 23.2 | 11.6 |

The above data show that the choice of recovery solvent has a definite influence upon the characteristics of the final pregelatinized product. Recovery with ethanol and acetone resulted in products with swelling power and solubles values higher than products recovered with methanol. However, products recovered with ethanol and acetone may retain the characteristic odor of these solvents, even though the products were dried in a vacuum oven at 110° C. for 4 hours. Products recovered with methanol did not retain the odor of methanol after drying in a 50° C. oven. Other solvents such as propanol, butanol and pentanol have effects similar to methanol but are tenaciously occluded by the starch.

Example VI.—Gelatinizing high-amylose corn starch with ammonia-methanol solutions Data was presented in Example I which show that high-amylose corn starch (55% apparent amylose) is completely gelatinized in a 55% ammonia-methanol solution. This example illustrates the effect of treating high amylose starch with 55, 60, 65.4 and 85% ammonia-methanol solutions. The two samples of pregelatinized high amylose corn starch were prepared according to the procedure in Example II, the only difference being in the relationship of the amounts of material used. Table VII shows the composition of the gelatinizing systems and the characteristics of the recovered pregelatinized products. High amylose starch pregelatinized in the 65.4% ammonia-methanol system has the unusual property of reaching maximum "hot paste" viscosity upon initial dispersion in cold water whereas the untreated high amylose starch must be heated to 120° C. to reach maximum "hot paste" viscosity.

TABLE VII

| Composition of the gelatinizing system | | | | Product characteristics | |
|---|---|---|---|---|---|
| Percent ammonia based on methanol | Grams | | | Swelling power, 25° C. | Percent solubles, d.b., 25° C. |
| | Starch | Methanol | Ammonia | | |
| Untreated | | | | 0 | 2.0 |
| 55 | 200 | 276 | 338 | 7 | 6.7 |
| 60 | 200 | 276 | 415 | 9 | 11.3 |
| 65.4 [1] | 100 | 277 | 524 | 10 | 15.1 |
| 85 | 500 | 751 | 1,135 | 10 | 15.6 |

[1] Procedure of Example IV.

Example VII.—Enzymic susceptibility of ammonia-methanol pregelatinized corn starch Unmodified corn starch (1 gram D.S.) was suspended in about 80 ml. of water and gelatinized by heating at boiling water temperature. The dispersion was allowed to cool to 40° C. and held at this temperature in a constant temperature water bath. A sample of liquid ammonia-methanol treated corn starch prepared according to Example II was slurried in water (1 gram/80 ml.) at room temperature, then placed in the 40° C. water bath. Both dispersions were buffered at pH 6.9 with 10 ml. of 0.2 M phosphate buffer. The enzyme (0.02 gram/2-ml. water) was then added to the starch dispersion and the overall volume quickly adjusted to 100 ml. with warm distilled water. Two-ml. aliquots were withdrawn at regular time intervals, the reducing power measured by the Hanes method (C. A. Browne and F. W. Zerban, "Physical and Chemical Methods of Sugar Analysis," third edition, p. 873, J. Wiley & Sons, New York, (1948)). The results (Table VIII) are expressed as mg. maltose produced by 1 gram of starch.

TABLE VIII.—ENZYMATIC HYDROLYSIS [1] WITH α-AMYLASE AND β-AMYLASE

| Time (minutes) | Unmodified corn starch (thermally gelatinized) | Ammonia pregelatinized corn starch (48.5% ammonia methanol gelatinized) |
|---|---|---|
| α-Amylase | | |
| 15 | 281 | 292 |
| 60 | 556 | 556 |
| 120 | 633 | 648 |
| 240 | 682 | 694 |
| β-Amylase | | |
| 15 | 275 | 273 |
| 60 | 584 | 579 |
| 120 | 694 | 682 |
| 240 | 740 | 716 |

[1] Results expressed as mg. of maltose per 1 gram of starch.

The experimental results show that the ammonia-methanol gelatinized corn starch dispersed in cold water is as completely susceptible to enzymic hydrolysis as unmodified corn starch gelatinized in boiling water.

Example VIII.—Ammonia-methanol pregelatinization of wheat starch

A sample of wheat starch was pregelatinized with ammonia-methanol using the same method described in Example IV using a 54.2% ammonia-methanol solution and a 30 minute holding time. Swelling power and solubles data were as follows:

| | Swelling power, 25° C. | Solubles, 25° C. |
|---|---|---|
| Original | 2.0 | 0.0 |
| 54.2% ammonia | 9.7 | 5.3 |
| 65.4% ammonia | 12.3 | 11.3 |

Brabender viscosities show that ammonia gelatinization greatly increases the hot paste viscosity of wheat starch. Starches from other grains, roots and tubers have been treated in ammonia-methanol systems with similar results. This process is applicable to other types of granular starch and is not restricted to wheat starch.

Example IX.—Application of ammonia-methanol pregelatinized corn starch to laundry sizing Ammonia-methanol pregelatinized corn starches were tested as laundry sizing agents. The fabric sizing test method consisted of placing 5 grams of starch in 1 quart of 32° C. water and dispersing it by agitation with the fingers. Complete dispersion was checked by pouring the slurry through a 30-mesh screen to check for undispersed lumps of starch. Nearly all the pregelatinized products have dispersed in 32° C. water within 30 seconds. Dark blue and light blue swatches of cotton cloth were rinsed in the liquid and squeezed to remove excess moisture. These were then neatly folded and rolled in a towel and held for 1 minute. They were then ironed dry and examined for undesirable areas of masking and flaking. Water spotting was determined by placing drops of water on the sized light blue coth, holding for 1 minute, ironing dry and inspecting for presence of spots. By this test all 45% ammonia-methanol pregelatinized corn starches have given very stiff sizes to fabric with no visible masking, flaking or water spotting. Untreated corn, ammonia-methanol pregelatinized corn starch and untreated rice starch, at equal concentration, seemed by touch to have equal sizing power on cotton fabric. Untreated corn starch settles very rapidly from a water suspension, but ammonia pregelatinized corn starch and the rice starch remain suspended for many hours. Ammonia-methanol pregelatinized corn starch applied to fabric was retained by the fabric upon drying in a commercial electric dryer. After drying, the fabric was moistened with water, ironed and found to be sized to nearly the same degree as fabric which had not been previously dried. Fabric dipped in suspensions of untreated corn or rice starch had very little size after being dried under similar conditions. Ammonia-methanol pregelatinized starches have this excellent property because they contain a water soluble substance that causes the starch granules to adhere to the fabric during the drying operation.

In addition to the above application, starches which have been pregelatinized in the ammonia-methanol system can be used with added convenience in any application where the starch must be cooked to be useful. These uses may include sizes for textiles including warp size, slasher size, and the like. thickener for inks used in textile printing; sizing glass fibers; beater sizes, tub sizes, calender sizes and the like for paper manufacture; adhesive for corrugated, chip and liner board. In foods, these starches are useful in gravies, sauces, puddings, pie fillings, instant baked goods, mixes, salad dressings, and many other uses wherever pregelatinized or cooked starches are presently used.

We claim:

1. A process for preparing a gelatinized starch which comprises contacting an ungelatinized starch with a solvent system consisting essentially of an alcohol and at least 45% by weight of liquid ammonia based on said system, and separating said starch from said solvent system.

2. The process of claim 1 wherein said alcohol is methanol.

3. The process of claim 1 wherein said solvent system contains 45–85% by weight of ammonia.

4. The process of claim 1 wherein said starch is corn starch.

5. The process of claim 4 wherein said corn starch is a high amylose content corn starch.

References Cited

UNITED STATES PATENTS 3,102,054 8/1963 Harris _____ 127—71
3,137,592 6/1964 Protzman et al. _____ 127—32

OTHER REFERENCES

J. E. Hodge et al., J. Am. Chem. Soc., 73, 3312–3316 (1951).

MORRIS O. WOLK, *Primary Examiner.*

S. MARANTZ, *Assistant Examiner.*